US012509536B2

(12) United States Patent
Wang et al.

(10) Patent No.: US 12,509,536 B2
(45) Date of Patent: Dec. 30, 2025

(54) PRODUCTION OF POLYPROPYLENE WITH LOW VOLATILES

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Georg Grestenberger, Linz (AT); Ramesh Kumar Selvasankar, Schwechat-Mannsworth (AT)

(73) Assignee: BOREALIS AG, Vienna (AT)

(*) Notice: Subject to any disclaimer, the term of this patent is extended or adjusted under 35 U.S.C. 154(b) by 576 days.

(21) Appl. No.: 18/001,674

(22) PCT Filed: Jun. 14, 2021

(86) PCT No.: PCT/EP2021/065910
§ 371 (c)(1),
(2) Date: Dec. 13, 2022

(87) PCT Pub. No.: WO2021/254938
PCT Pub. Date: Dec. 23, 2021

(65) Prior Publication Data
US 2023/0331881 A1 Oct. 19, 2023

(30) Foreign Application Priority Data
Jun. 15, 2020 (EP) .................................... 20179932

(51) Int. Cl.
C08F 10/06 (2006.01)
C08F 2/00 (2006.01)
C08F 2/02 (2006.01)
C08F 2/34 (2006.01)
C08F 4/6592 (2006.01)
C08F 110/06 (2006.01)
C08J 3/12 (2006.01)
C08K 3/012 (2018.01)
C08K 5/098 (2006.01)
C08K 5/52 (2006.01)
C08L 23/10 (2006.01)

(52) U.S. Cl.
CPC .......... C08F 110/06 (2013.01); C08F 2/001 (2013.01); C08F 2/02 (2013.01); C08F 2/34 (2013.01); C08F 4/65927 (2013.01); C08J 3/12 (2013.01); C08K 3/012 (2018.01); C08K 5/098 (2013.01); C08K 5/52 (2013.01); C08F 10/06 (2013.01); C08J 2323/12 (2013.01); C08J 2323/26 (2013.01); C08L 23/10 (2013.01)

(58) Field of Classification Search
None
See application file for complete search history.

(56) References Cited

U.S. PATENT DOCUMENTS

2004/0132964 A1* 7/2004 Mulgrew .................. B29B 7/82
528/481
2017/0137544 A1* 5/2017 Bercx ...................... C08L 23/12
2021/0403677 A1* 12/2021 Fuchs ....................... C08K 5/20

FOREIGN PATENT DOCUMENTS

| DE | 202013103803 U1 | 11/2014 |
| EP | 3121187 A1 | 1/2017 |
| JP | 2007245490 A | 9/2007 |
| WO | 20010042009 A1 | 6/2001 |
| WO | 2013144061 A1 | 10/2013 |
| WO | 2015150042 A1 | 10/2015 |
| WO | 2018108929 A1 | 6/2018 |

OTHER PUBLICATIONS

Applicant: Borealis AG; "Production of Polypropylene with Low Volatiles"; European Application No. 20179932; Extended European Search Report dated Nov. 16, 2020; 7 pgs.
Applicant: Borealis AG; "Production of Polypropylene with Low Volatiles"; International Application No. PCT/EP2021/065910; PCT International Search Report and Written Opinion dated Sep. 6, 2021; 13 pgs.
Applicant: Borealis AG; International Application No. PCT/EP2020/065445; PCT Notification of Transmittal of the International Preliminary Report on Patentability dated Sep. 10, 2021; 8 pgs.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1137.
Cheng, et al., "13C Nmr Analysis of Ethylene-Propylene Rubbers", Macromolecules 17, 1984, 1950-1955.
Resconi, Luigi, et al., "Selectivity in Propane Polymerization With Metallocene Catalysts", Chem. Rev. 2000, 100, 1253-1345.
Singh, Gurmeet, et al., "Triad Sequence Determination of Ethylene-Propylene Copolymers—Application of Quantitative 13C NMR", Polymer Testing 28 (2009) 475-479.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.

* cited by examiner

Primary Examiner — Richard A. Huhn
(74) Attorney, Agent, or Firm — Tarolli, Sundheim, Covell & Tummino LLP

(57) ABSTRACT

Process for producing a polypropylene comprising the steps of polymerizing the polypropylene in the presence of a metallocene catalyst, visbreaking said polypropylene and subsequently aerating the polypropylene at elevated temperature.

17 Claims, No Drawings

PRODUCTION OF POLYPROPYLENE WITH LOW VOLATILES

The present invention is directed to a process for producing polypropylene pellets having low amounts of volatiles.

Polypropylenes resulting from solution or bulk polymerization often contain traces of the medium in which the polymerization reaction has been carried out, as well as low molecular weight by-products of the polymerization process. Accordingly, such polypropylenes already contain considerable amounts of undesired volatiles which are detected as volatile (VOC, VDA 278 October 2011) and semi-volatile organic condensables (FOG, VDA 278 October 2011). Sometimes such polymerization products must be further treated in a post-reactor process to enhance processability of said polymers, which further increases the amount of volatiles. Accordingly, due to the polymerization and post-reactor treatment, like visbreaking of the polypropylene, products are obtained containing amounts of volatiles which are not acceptable for the costumers.

Accordingly, the object of the present invention is to provide polypropylene pellets with low amounts of volatiles even though they have rather low molecular weight which has been achieved by visbreaking.

The finding of the present invention is to produce a polypropylene in the presence of a metallocene catalyst, visbreaking said polypropylene and subsequently apply degassing at elevated temperatures.

Accordingly, the present invention is directed to a process for producing polypropylene pellets comprising the steps in the order of (a) polymerizing propylene and optionally at least one α-olefin selected from ethylene, 1-butene and 1-hexene in the presence of a metallocene catalyst obtaining thereby a polypropylene in the form of a powder, wherein
the obtained polypropylene powder has a melt flow rate $MFR_2$ (230° C., 2.16 kg) measured according to ISO 1133 in the range of 1.0 to 100 g/10 min, (b) optionally mixing the polypropylene powder with additives, (c) visbreaking the polypropylene powder of step (a) or the mixture of step (b) with a visbreaking agent in a continuous melt-mixing device, obtaining thereby a polypropylene in form of pellets,
wherein polypropylene pellets have a melt flow rate $MFR_2$ (230° C., 2.16 kg) measured according to ISO 1133 being higher than the melt flow rate $MFR_2$ (230° C., 2.16 kg) of the polypropylene powder of step (a),
wherein further
the visbreaking ratio (VR) is in the range of 2.0 to 25.0, wherein the visbreaking ratio (VR) is determined according to equation $$VR = MFR_{2(FINAL)}/MFR_{2(START)}$$

wherein
"$MFR_{2(FINAL)}$" is melt flow rate $MFR_2$ (230° C.; 2.16 kg) measured according to ISO 1133 of the polypropylene pellets after visbreaking,
"$MFR_{2(START)}$" is melt flow rate $MFR_2$ (230° C.; 2.16 kg) measured according to ISO 1133 of the polypropylene powder before visbreaking, (d) aerating the polypropylene pellets of step (c) in an aeration vessel for 1 to 15 hours with an aeration gas having a temperature of at least 40° C. but lower than the heat deflection temperature (HDT) measured according to ISO 75 B method at a stress of 0.45 MPa of the polypropylene pellets of step (c), (e) discharging the polypropylene pellets of step (d) from the aeration vessel.

The visbreaking agent is preferably a peroxide or a hydroxylamine ester.

Preferably, step (b) is omitted.

Also preferably, the continuous melt-mixing device of step (c) is a single-screw extruder or a co-rotating twin-screw extruder.

Further preferred embodiments of the invention are reflected in the dependent claims. In the following the invention will be describe in more detail.

The Polypropylene Pellets

The process according to this invention is directed to a process for the manufacture of polypropylene pellets. The term "pellets" indicate that the final product of the inventive process is not a polymer powder, which is normally obtained directly after the polymerization process but a polymer product which has been subjected to a further melting and subsequent cooling step, like for instance when extruding the polymer powder. In the present invention the further melting step and cooling step occurs at least during the visbreaking step (c).

Typically, the polypropylene pellets according to this invention have a median particle size d50 in the range of 2.5 to 5.0 mm.

The polypropylene pellets may contain typical additives, which for instance are added during step (b) and/or during the visbreaking step (c). Typical additives are acid scavengers, antioxidants, colorants, light stabilizers, slip agents, anti-scratch agents, dispersing agents, processing aids, lubricants, pigments, and the like. According to this invention, the visbreaking agent, like the peroxide or the hydroxylamine ester, is not regarded as an additive.

Such additives are commercially available and for example described in "Plastic Additives Handbook", 6th edition 2009 of Hans Zweifel (pages 1141 to 1190).

Additives are frequently provided in the form of a masterbatch. A masterbatch is a composition in which an additive or an additive mixture in rather high amount is dispersed in a polymer. Accordingly, the term "additive" according to the present invention also includes carrier materials, in particular polymeric carrier materials, in which the "active additive" or "active additive mixture" is dispersed.

The amount of the additives in the polypropylene pellets are preferably in the range of 0.05 to 5.0 wt.-% based on the total amount of the polypropylene pellets. For the avoidance of doubt, the remaining part of the polypropylene pellets after step (e) is the polypropylene as such.

Accordingly, the polypropylene pellets after step (e) according to this invention consists of
95.0 to 99.95 wt.-% of the polypropylene and
0.05 to 5.0 wt.-% of additives,
based on the total amount of the polypropylene pellets.

The polypropylene of the polypropylene pellets can be any type of polypropylene, like a propylene homopolymer, a random propylene copolymer or a heterophasic propylene copolymer. Preferably, the polypropylene of the polypropylene pellets according to this invention is a monophasic polypropylene. Monophasic polypropylene according to this invention is either a random propylene copolymer or a propylene homopolymer. The latter is especially preferred.

A monophasic polypropylene does not comprise polymer components which are not miscible with each other as it is the case for heterophasic propylene copolymers. In contrast to monophasic systems, heterophasic systems comprise a continuous polymer phase, like a polypropylene, in which a further non-miscible polymer, like an elastomeric polymer, is dispersed as inclusions. Said polypropylene systems containing a polypropylene matrix and inclusions as a second polymer phase would by contrast be called heterophasic. The presence of second polymer phases or the so-called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Further, in case the polypropylene contains monomers different to propylene, they are selected from ethylene, 1-butene and 1-hexene. It is especially preferred, that in case the polypropylene contains comonomers, the comonomers are ethylene only.

The amount of comonomers is preferably not too high. That is, it is preferred that the amount of comonomers is not more than 5.0 wt.-%, more preferably not more than 2.5 wt.-%, even more preferably not more than 1.0 wt.-%. Accordingly, in case the polypropylene contains comonomers it is preferably a propylene random copolymer, i.e. a monophasic polypropylene, having a comonomer content in the range of 0.3 to 2.5 wt.-%, more preferably in the range of 0.5 to 1.0 wt.-%. It is especially preferred that the polypropylene is a propylene-ethylene random copolymer, i.e. a monophasic polypropylene, having an ethylene content in the range of 0.3 to 2.5 wt.-%, more preferably in the range of 0.5 to 1.0 wt.-%.

In the most preferred embodiment, the monophasic polypropylene according to this invention is a propylene homopolymer.

Therefore, in one preferred embodiment the polypropylene pellets after step (e) according to this invention consist of
  (a) 95.0 to 99.95 wt.-% of a propylene-ethylene random copolymer having an ethylene content in the range of 0.3 to 2.5 wt.-%, and
  (b) 0.05 to 5.0 wt.-% of additives
  based on the total amount of the polypropylene pellets, preferably wherein
  polypropylene pellets have a median particle size d50 in the range of 2.5 to 5.0 mm.

In an especially preferred embodiment the polypropylene pellets after step (e) consist of
  (a) 95.0 to 99.95 wt.-% of a propylene homopolymer, and
  (b) 0.05 to 5.0 wt.-% of additives
  based on the total amount of the polypropylene pellets, preferably wherein
  polypropylene pellets have a median particle size d50 in the range of 2.5 to 5.0 mm.

As will be explained in more detail below the polypropylene according to this invention is produced in the presence of a specific metallocene catalyst as defined in more detail below. In contrast to polypropylenes produced in the presence of Ziegler-Natta catalysts, polypropylenes produced in the presence of metallocene catalysts are characterized by mis-insertions of monomer units during the polymerization process. Accordingly, it is preferred that the polypropylene of the polypropylene pellets has 2,1 regio-defects determined by 130-NMR spectroscopy in the range of 0.10 to 0.90%, more preferably in the range of 0.15 to 0.80%.

Therefore, in one preferred embodiment the polypropylene pellets after step (e) according to this invention consist of
  (a) 95.0 to 99.95 wt.-% of a propylene-ethylene random copolymer having
    (i) an ethylene content in the range of 0.3 to 2.5 wt.-%, and
    (ii) 2,1 regio-defects determined by 130-NMR spectroscopy in the range of 0.10 to 0.90%,
  and
  (b) 0.05 to 5.0 wt.-% of additives
  based on the total amount of the polypropylene pellets, preferably wherein
  polypropylene pellets have a median particle size d50 in the range of 2.5 to 5.0 mm.

In an especially preferred embodiment the polypropylene pellets after step (e) according to this invention consist of
  (a) 95.0 to 99.95 wt.-% of a propylene homopolymer having 2,1 regio-defects determined by $^{13}$C-NMR spectroscopy in the range of 0.10 to 0.90%, and
  (b) 0.05 to 5.0 wt.-% of additives
  based on the total amount of the polypropylene pellets, preferably wherein
  polypropylene pellets have a median particle size d50 in the range of 2.5 to 5.0 mm.

An essential step of the manufacture of the polypropylene pellets is that the polypropylene of said polypropylene pellets has been visbroken. Accordingly it is preferred that the polypropylene pellets have a rather high melt flow rate $MFR_2$. Thus, in a preferred embodiment of this invention the polypropylene pellets after step (e) have a melt flow rate $MFR_2$ (230° C., 2.16 kg) measured according to ISO 1133 in the range of 20 to 2000 g/10 min, more preferably in the range of 40 to 1500 g/10 min, even more preferably in the range of 60 to 1000 g/10 min.

Thus, in a specific embodiment the polypropylene pellets after step (e) have a melt flow rate $MFR_2$ (230° C., 2.16 kg) measured according to ISO 1133 in the range of 40 to 1500 g/10 min, wherein the polypropylene of the polypropylene pellets have 2,1 regio-defects determined by $^{13}$C-NMR spectroscopy in the range of 0.15 to 0.80%.

It is especially preferred that the polypropylene pellets after step (e) according to this invention consist of
  (a) 95.0 to 99.95 wt.-% of a propylene-ethylene random copolymer having an ethylene content in the range of 0.5 to 2.0 wt.-%, and
  (b) 0.05 to 5.0 wt.-% of additives
  based on the total amount of the polypropylene pellets, wherein the polypropylene pellets have a melt flow rate $MFR_2$ (230° C., 2.16 kg) measured according to ISO 1133 in the range of 40 to 1500 g/10 min
  preferably wherein further
  polypropylene pellets have a median particle size d50 in the range of 2.5 to 5.0 mm.

In a very specific embodiment the polypropylene pellets after step (e) according to this invention consist of
  (a) 95.0 to 99.95 wt.-% of a propylene-ethylene random copolymer having
    (i) an ethylene content in the range of 0.3 to 2.5 wt.-%, and
    (ii) 2,1 regio-defects determined by $^{13}$C-NMR spectroscopy in the range of 0.10 to 0.90%,
  and
  (b) 0.05 to 5.0 wt.-% of additives
  based on the total amount of the polypropylene pellets, wherein the polypropylene pellets have a melt flow rate $MFR_2$ (230° C., 2.16 kg) measured according to ISO 1133 in the range of 40 to 1500 g/10 min, preferably wherein further
polypropylene pellets have a median particle size d50 in the range of 2.5 to 5.0 mm.

In a particularly preferred embodiment the polypropylene pellets after step (e) according to this invention consist of
(a) 95.0 to 99.95 wt.-% of a propylene homopolymer, and
(b) 0.05 to 5.0 wt.-% of additives
based on the total amount of the polypropylene pellets,
wherein the polypropylene pellets have a melt flow rate MFR$_2$ (230° C., 2.16 kg) measured according to ISO 1133 in the range of 40 to 1500 g/10 min,
preferably wherein further
polypropylene pellets have a median particle size d50 in the range of 2.5 to 5.0 mm.

In a very specific preferred embodiment the polypropylene pellets after step (e) according to this invention consist of
(a) 95.0 to 99.95 wt.-% of a propylene homopolymer having 2,1 regio-defects determined by $^{13}$C-NMR spectroscopy in the range of 0.10 to 0.90%, and
(b) 0.05 to 5.0 wt.-% of additives
based on the total amount of the polypropylene pellets,
wherein the polypropylene pellets have a melt flow rate MFR$_2$ (230° C., 2.16 kg) measured according to ISO 1133 in the range of 40 to 1500 g/10 min,
preferably wherein further
polypropylene pellets have a median particle size d50 in the range of 2.5 to 5.0 mm.

Due to the specific process, not only polypropylene pellets with rather high melt flow rate MFR$_2$ can be reached, but also with a very narrow molecular weight distribution. Accordingly it is preferred that the polypropylene pellets according to this invention have a molecular weight distribution (MWD) determined by gel permeation chromatography (GPC) in the range of 1.0 to below 3.2, more preferably in the range of 1.5 to 3.0.

It is therefore especially preferred that the polypropylene pellets after step (e) of this invention have a melt flow rate MFR$_2$ (230° C., 2.16 kg) measured according to ISO 1133 in the range of 40 to 1500 g/10 min and a molecular weight distribution (MWD) determined by gel permeation chromatography (GPC) in the range of 1.0 to below 3.2.

It is especially preferred that the polypropylene pellets after step (e) according to this invention consist of
(a) 95.0 to 99.95 wt.-% of a propylene-ethylene random copolymer having an ethylene content in the range of 0.3 to 2.5 wt.-%, and
(b) 0.05 to 5.0 wt.-% of additives
based on the total amount of the polypropylene pellets,
wherein the polypropylene pellets have a melt flow rate MFR$_2$ (230° C., 2.16 kg) measured according to ISO 1133 in the range of 40 to 1500 g/10 min and a molecular weight distribution (MWD) determined by gel permeation chromatography (GPC) in the range of 1.0 to below 3.2,
preferably wherein further
polypropylene pellets have a median particle size d50 in the range of 2.5 to 5.0 mm.

In a very specific embodiment, the polypropylene pellets after step (e) according to this invention consist of
(a) 95.0 to 99.95 wt.-% of a propylene-ethylene random copolymer having
(i) an ethylene content in the range of 0.3 to 2.5 wt.-%, and
(ii) 2,1 regio-defects determined by $^{13}$C-NMR spectroscopy in the range of 0.10 to 0.90%,
and
(b) 0.05 to 5.0 wt.-% of additives
based on the total amount of the polypropylene pellets,
wherein the polypropylene pellets have a melt flow rate MFR$_2$ (230° C., 2.16 kg) measured according to ISO 1133 in the range of 40 to 1500 g/10 min and a molecular weight distribution (MWD) determined by gel permeation chromatography (GPC) in the range of 1.0 to below 3.2,
preferably wherein further
polypropylene pellets have a median particle size d50 in the range of 2.5 to 5.0 mm.

In a particular preferred embodiment the polypropylene pellets after step (e) according to this invention consist of
(a) 95.0 to 99.95 wt.-% of a propylene homopolymer, and
(b) 0.05 to 5.0 wt.-% of additives
based on the total amount of the polypropylene pellets,
wherein the polypropylene pellets have a melt flow rate MFR$_2$ (230° C., 2.16 kg) measured according to ISO 1133 in the range of 40 to 1500 g/10 min and a molecular weight distribution (MWD) determined by gel permeation chromatography (GPC) in the range of 1.0 to below 3.2,
preferably wherein further
polypropylene pellets have a median particle size d50 in the range of 2.5 to 5.0 mm.

In a very specific preferred embodiment the polypropylene pellets after step (e) according to this invention consists of
(a) 95.0 to 99.95 wt.-% of a propylene homopolymer having 2,1 regio-defects determined by $^{13}$C-NMR spectroscopy in the range of 0.10 to 0.90%, and
(b) 0.05 to 5.0 wt.-% of additives
based on the total amount of the polypropylene pellets,
wherein the polypropylene pellets have a melt flow rate MFR$_2$ (230° C., 2.16 kg) measured according to ISO 1133 in the range of 40 to 1500 g/10 min and a molecular weight distribution (MWD) determined by gel permeation chromatography (GPC) in the range of 1.0 to below 3.2,
preferably wherein further
polypropylene pellets have a median particle size d50 in the range of 2.5 to 5.0 mm.

Typically the polypropylene pellets have a rather low xylene cold soluble (XCS) content. It is therefore especially preferred that the polypropylene pellets after step (e) of this invention have a xylene cold soluble (XCS) fraction measured according to ISO 16152 (25° C.) in the range of 0.05 to 2.00 wt.-%, more preferably in the range of 0.05 to 1.50 wt.-%, even more preferably in the range of 0.05 to 1.00 wt.-%.

It is therefore especially preferred that the polypropylene pellets after step (e) have a xylene cold soluble (XCS) fraction measured according to ISO 16152 (25° C.) in the range of 0.05 to 2.00 wt.-%, a melt flow rate MFR$_2$ (230° C., 2.16 kg) measured according to ISO 1133 in the range of 40 to 1500 g/10 min and a molecular weight distribution (MWD) determined by gel permeation chromatography (GPC) in the range of 1.0 to below 3.2.

Accordingly, in a specific embodiment the polypropylene pellets after step (e) according to this invention consist of
(a) 95.0 to 99.95 wt.-% of a propylene-ethylene random copolymer having
(i) an ethylene content in the range of 0.3 to 2.5 wt.-%, and (ii) 2,1 regio-defects determined by $^{13}$C-NMR spectroscopy in the range of 0.10 to 0.90%,
and
(b) 0.05 to 5.0 wt.-% of additives
based on the total amount of the polypropylene pellets,
wherein the polypropylene pellets have
   (iii) a xylene cold soluble (XCS) fraction measured according to ISO 16152 (25° C.) in the range of 0.05 to 2.00 wt.-%,
   (iv) a melt flow rate MFR$_2$ (230° C., 2.16 kg) measured according to ISO 1133 in the range of 40 to 1500 g/10 min, and
   (v) a molecular weight distribution (MWD) determined by gel permeation chromatography (GPC) in the range of 1.0 to below 3.2,
preferably wherein further
polypropylene pellets have a median particle size d50 in the range of 2.5 to 5.0 mm.

In a very specific preferred embodiment the polypropylene pellets after step (e) according to this invention consists of
(a) 95.0 to 99.95 wt.-% of a propylene homopolymer having 2,1 regio-defects determined by $^{13}$C-NMR spectroscopy in the range of 0.10 to 0.90%, and
(b) 0.05 to 5.0 wt.-% of additives
based on the total amount of the polypropylene pellets,
wherein the polypropylene pellets have
   (iii) a xylene cold soluble (XCS) fraction measured according to ISO 16152 (25° C.) in the range of 0.05 to 1.00 wt.-%,
   (iv) a melt flow rate MFR$_2$ (230° C., 2.16 kg) measured according to ISO 1133 in the range of 40 to 1500 g/10 min, and
   (v) a molecular weight distribution (MWD) determined by gel permeation chromatography (GPC) in the range of 1.0 to below 3.2,
preferably wherein further
polypropylene pellets have a median particle size d50 in the range of 2.5 to 5.0 mm.

The polypropylene pellets after step (e) are furthermore especially characterized by their low volatiles content. Accordingly in a preferred embodiment the polypropylene pellets after step (e) have a VOC (volatile organic compounds) value determined according to VDA 278 October 2011 of not more than 55.0 µg/g, more preferably in the range of 3.0 to 50.0 µg/g, still more preferably in the range of 5.0 to 45.0 µg/g.

Additionally or alternatively to the requirement of the previous paragraph, the polypropylene pellets after step (e) have an FOG (low volatility or condensable organic compounds) value determined according to VDA 278 October 2011 of not more than 82 µg/g, more preferably in the range of 10 to 80 µg/g, still more preferably in the range of 20 to 78 µg/g.

It is therefore especially preferred that the polypropylene pellets after step (e) have
(a) a melt flow rate MFR$_2$ (230° C., 2.16 kg) measured according to ISO 1133 in the range of 40 to 1500 g/10 min,
(b) a molecular weight distribution (MWD) determined by gel permeation chromatography (GPC) in the range of 1.0 to below 3.2, and
(c) a VOC (volatile organic compounds) value determined according to VDA 278 October 2011 in the range of 3.0 to 50.0 µg/g,
wherein optionally the polypropylene of the polypropylene pellets has 2,1 regio-defects determined by $^{13}$C-NMR spectroscopy in the range of 0.10 to 0.90%.

Accordingly, in preferred embodiment of the present invention the polypropylene pellets after step (e) consist of
(a) 95.0 to 99.95 wt.-% of a propylene-ethylene random copolymer having
   (i) an ethylene content in the range of 0.3 to 2.5 wt.-%, and
   (ii) 2,1 regio-defects determined by $^{13}$C-NMR spectroscopy in the range of 0.10 to 0.90%,
and
(b) 0.05 to 5.0 wt.-% of additives
based on the total amount of the polypropylene pellets,
wherein the polypropylene pellets have
   (iii) a melt flow rate MFR$_2$ (230° C., 2.16 kg) measured according to ISO 1133 in the range of 40 to 1500 g/10 min,
   (iv) a molecular weight distribution (MWD) determined by gel permeation chromatography (GPC) in the range of 1.0 to below 3.2,
   (v) a VOC (volatile organic compounds) value determined according to VDA 278 October 2011 in the range of 3.0 to 50.0 µg/g, and
   (vi) optionally a xylene cold soluble (XCS) fraction measured according to ISO 16152 (25° C.) in the range of 0.05 to 2.00 wt.-%,
preferably wherein further
polypropylene pellets have a median particle size d50 in the range of 2.5 to 5.0 mm.

It is especially preferred that the polypropylene pellets of the previous paragraph have an FOG (low volatility or condensable organic compounds) value determined according to VDA 278 October 2011 more preferably in the range of 20 to 80 µg/g.

In a very specific preferred embodiment the polypropylene pellets after step (e) according to this invention consists of
(a) 95.0 to 99.95 wt.-% of a propylene homopolymer having 2,1 regio-defects determined by $^{13}$C-NMR spectroscopy in the range of 0.10 to 0.90%, and
(b) 0.05 to 5.0 wt.-% of additives
based on the total amount of the polypropylene pellets,
wherein the polypropylene pellets have
   (iii) a melt flow rate MFR$_2$ (230° C., 2.16 kg) measured according to ISO 1133 in the range of 40 to 1500 g/10 min,
   (iv) a molecular weight distribution (MWD) determined by gel permeation chromatography (GPC) in the range of 1.0 to below 3.2,
   (v) a VOC (volatile organic compounds) value determined according to VDA 278 October 2011 in the range of 3.0 to 50.0 µg/g, and
   (vi) optionally a xylene cold soluble (XCS) fraction measured according to ISO 16152 (25° C.) in the range of 0.05 to 1.50 wt.-%
preferably wherein further
polypropylene pellets have a median particle size d50 in the range of 2.5 to 5.0 mm.

It is in particular preferred that the polypropylene pellets of the previous paragraph have an FOG (low volatility or condensable organic compounds) value determined according to VDA 278 October 2011 more preferably in the range of 10 to 80 µg/g.

In the following, the individual steps to obtain the polypropylene pellets according to this invention will be described.

The Polymerization Step (Step (a)) and the Optional Additivating Step (Step (b))

In a first step, i.e. in step (a), a polypropylene is produced. Essential requirement of this process is that the polypropylene must be produced in the presence of a metallocene catalyst. The metallocene catalyst used in the invention can be used in non-supported form or in solid form. The metallocene catalyst of the invention should however be used as a heterogeneous (solid) catalyst.

Generally, the quantity of metallocene catalyst will depend upon the nature of the metallocene catalyst, the selected reactor types and conditions and the properties desired for the polypropylene.

The metallocene catalyst of the invention in solid form, preferably in solid particulate form, can be either supported on an external carrier material, like clay minerals, silica or alumina, or is free from an external carrier, however still being in solid form.

It is especially preferred polypropylene is produced in the presence of a metallocene catalyst of formula (I)

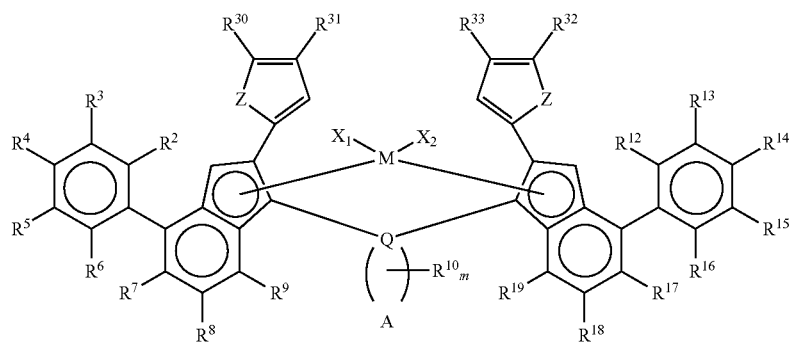

(I)

wherein

M is Ti, Zr or Hf.

Z is an oxygen atom or a sulfur atom,

R30, R31, R32 and R33 may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, or an aryl group having a carbon number of 6 to 18, Q is a carbon atom, a silicon atom or a germanium atom, each of X1 and X2 is independently a halogen atom, an alkyl group having a carbon number of 1 to 6, an aryl group having a carbon number of 6 to 18, an amino group substituted with an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18, R7 and R17 may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, or a halogen-containing aryl group having a carbon number of 6 to 18, and when either one of R7 and R17 is a hydrogen atom, the other is a substituent except for a hydrogen atom, R8 and R18 may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18, R2, R3, R4, R5, R6, R9, R12, R13, R14, R15, R16 and R19 may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, a halogen-containing aryl group having a carbon number of 6 to 18, A is a divalent hydrocarbon group having a carbon number of 3 to 12 and forming a ring together with Q to which it is bonded, and may contain an unsaturated bond, R10 is a substituent on A and is an alkyl group having a carbon number of 1 to 6, a halogen containing alkyl group having a carbon number of 1 to 6, a trialkylsilyl group-containing alkyl group having a carbon number of 1 to 6, a silyl group containing a hydrocarbon group having a carbon number of 1 to 6, an aryl group having a carbon number of 6 to 18, or a halogen-containing aryl group having a carbon number of 6 to 18, m represents an integer of 0 to 24, and when m is 2 or more, R10s may combine with each other to form a new ring structure).

In formula (I), specific examples of the alkyl group having a carbon number of 1 to 6 include a methyl group, an ethyl group, an n-propyl group, an i-propyl group, an n-butyl group, an i-butyl group, an s-butyl group, a tert-butyl group, an n-pentyl group, an n-hexyl group, a cyclopropyl group, a cyclopentyl group, and a cyclohexyl group.

Specific examples of the alkoxy group having a carbon number of 1 to 6 include a methoxy group, an ethoxy group, a n-propoxy group, an i-propoxy group, a n-butoxy group, a i-butoxy group, a tert-butoxy group, and a phenoxy group.

The aryl group having a carbon number of 6 to 18 may be substituted with a hydrocarbon group having a carbon number of 1 to 6, and specific examples of the aryl group include a phenyl group, a tolyl group, a dimethylphenyl group, an ethylphenyl group, a trimethylphenyl group, a tert-butylphenyl group, a di-tert-butylphenyl group, a biphenyl group, a 1-naphthyl group, a 2-naphthyl group, an acenaphthyl group, a phenanthryl group, and an anthryl group.

In formula (I), the halogen atom includes a chlorine atom, a bromine atom, an iodine atom, and a fluorine atom.

The amino group substituted with an alkyl group having a carbon number of 1 to 6 includes a dimethylamino group, a diethylamino group, a di-n-propylamino group, a di-i-propylamino group, a methylethylamino group, etc.

The halogen atom in the halogen-containing alkyl group having a carbon number of 1 to 6 includes a fluorine atom, a chlorine atom, a bromine atom, and an iodine atom. The halogen-containing alkyl group having a carbon number of 1 to 6 is an alkyl group where a hydrogen atom on the skeleton of an alkyl group having a carbon number of 1 to 6 is replaced by a halogen atom.

Specific examples thereof include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group.

In formula (I), the halogen-containing aryl group having a carbon number of 6 to 18 is specifically, for example, an aryl group in which a hydrogen atom of the above-described aryl group having a carbon number of 6 to 18 is replaced by a halogen atom, and specific examples thereof include 2-, 3- and 4-substituted fluorophenyl groups, 2-, 3- and 4-substituted chlorophenyl groups, 2-, 3- and 4-substituted bromophenyl groups, 2,4-, 2,5-, 2,6- and 3,5-substituted difluorophenyl groups, 2,4-, 2,5-, 2,6-, and 3,5-substituted dichlorophenyl groups, 2,4,6-, 2,3,4-, 2,4,5-, and 3,4,5-substituted trifluorophenyl groups, 2,4,6-, 2,3,4-, 2,4,5-, and 3,4,5-substituted trichlorophenyl groups, a pentafluorophenyl group, a pentachlorophenyl group, a 3,5-dimethyl-4-chlorophenyl group.

In formula (I), specific examples of the furyl group, the thienyl group, the furyl group having a substituent, and the thienyl group having a substituent include a 2-furyl group, a 2-(5-methylfuryl) group, a 2-(5-ethylfuryl) group, a 2-(5-n-propylfuryl) group, a 2-(5-i-propylfuryl) group, a 2-(5-tert-butylfuryl) group, a 2-(5-trimethylsilylfuryl) group, a 2-(5-triethylsilylfuryl) group, a 2-(5-phenylfuryl) group, a 2-(5-tolylfuryl) group, a 2-(5-fluorophenylfuryl) group, a 2-(5-chlorophenylfuryl) group, a 2-(4,5-dimethylfuryl) group, a 2-(3,5-dimethylfuryl) group, a 2-benzofuryl group, a 3-furyl group, a 3-(5-methylfuryl) group, a 3-(5-ethylfuryl) group, a 3-(5-n-propylfuryl) group, a 3-(5-i-propylfuryl) group, a 3-(5-tertbutylfuryl) group, a 3-(5-trimethylsilylfuryl) group, a 3-(5-triethylsilylfuryl) group, a 3-(5-phenylfuryl) group, a 3-(5-tolylfuryl) group, a 3-(5-fluorophenylfuryl) group, a 3-(5-chlorophenylfuryl) group, a 3-(4,5-dimethylfuryl) group, a 3-benzofuryl group, a 2-thienyl group, a 2-(5-methylthienyl) group, a 2-(5-ethylthienyl) group, a 2-(5-n-propylthienyl) group, a 2-(5-ipropylthienyl) group, a 2-(5-tert-butylthienyl) group, a 2-(5-trimethylsilylthienyl) group, a 2-(5-triethylsilylthienyl) group, a 2-(5-phenylthienyl) group, a 2-(5-tolylthienyl) group, a 2-(5-fluorophenylthienyl) group, a 2-(5-chlorophenylthienyl) group, a 2-(4,5-dimethylthienyl) group, a 2-(3,5-dimethylthienyl) group, a 2-benzothienyl group, a 3-thienyl group, a 3-(5-methylthienyl) group, a 3-(5-ethylthienyl) group, a 3-(5-n-propylthienyl) group, a 3-(5-i-propylthienyl) group, a 3-(5-tertbutylthienyl) group, a 3-(5-trimethylsilylthienyl) group, a 3-(5-triethylsilylthienyl) group, a 3-(5-phenylthienyl) group, a 3-(5-tolylthienyl) group, a 3-(5-fluorophenylthienyl) group, a 3-(5-chlorophenylthienyl) group, a 3-(4,5-dimethylthienyl) group, and a 3-benzothienyl group.

In formula (I), M is Ti, Zr or Hf, preferably Zr or Hf, more preferably Zr. Q is a carbon atom, a silicon atom or a germanium atom, preferably a silicon atom or a germanium atom.

Each of X1 and X2 is independently a halogen atom, an alkyl group having a carbon number of 1 to 6, an aryl group having a carbon number of 6 to 18, an amino group substituted with an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18.

Among these, a halogen atom and a hydrocarbon group having a carbon number of 1 to 6 are preferred, and specifically, a chlorine atom, a bromine atom, an iodine atom, a methyl group, an ethyl group, an i-butyl group, and a phenyl group are more preferred.

R7 and R17 may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, or a halogen-containing aryl group having a carbon number of 6 to 18, and when either one of R7 and R17 is a hydrogen atom, the other is a substituent except for a hydrogen atom. R7 and R17 are preferably an alkyl group having a carbon number of 1 to 6 or an alkoxy group having a carbon number of 1 to 6, more preferably an alkyl group having a carbon number of 1 to 6. Among others, R7 and R17 are preferably a methyl group.

R8 and R18 may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, or a halogen-containing aryl group having a carbon number of 6 to 18. R8 and R18 are preferably an alkyl group having a carbon number of 1 to 6. Among others, R8 and R18 are preferably a methyl group.

In preferred embodiment, the R7 and R17 and R8 and R18 are identical and preferably selected from an alkyl group having a carbon number of 1 to 6. Especially preferred is that R7 and R17 and R8 and R18 are methyl groups.

R2, R3, R4, R5, R6, R9, R12, R13, R14, R15, R16 and R19 may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18.

R9 and R19, which are a substituent on an indenyl group, are preferably a hydrogen atom, an alkyl group having a carbon number of 1 to 6, or an alkoxy group having a carbon number of 1 to 6, more preferably a hydrogen atom.

R2, R3, R4, R5, R6, R12, R13, R14, R15, and R16, which are a substituent of a phenyl group on the 4-position of an indenyl group, are preferably a hydrogen atom, a halogen atom, an alkyl group having a carbon number of 1 to 6, a trialkylsilyl group-containing alkyl group having a carbon number of 1 to 6, or an aryl group having a carbon number of 6 to 18. In addition, R2, R6, R12 and R16 are preferably a hydrogen atom.

In formula (I), the substituent R31 is preferably a hydrogen atom, a halogen atom, an alkyl group having a carbon number of 1 to 6, or an aryl group having a carbon number of 6 to 18, more preferably a hydrogen atom or an alkyl group having a carbon number of 1 to 6. The substituent R30 is preferably a halogen atom, an alkyl group having a carbon number of 1 to 6, or an aryl group having a carbon number of 6 to 18, more preferably an alkyl group having a carbon number of 1 to 6 or an aryl group having a carbon number of 6 to 18.

A is a divalent hydrocarbon group having a carbon number of 3 to 12 and forming a ring together with Q to which it is bonded, and may contain an unsaturated bond. A is preferably a divalent hydrocarbon group having a carbon number of 3 to 6 and forming a 4- to 7-membered ring, and A is more preferably a divalent hydrocarbon group having a carbon number of 3 or 4 and forming a 4- or 5-membered ring.

R10 is a substituent on A and is an alkyl group having a carbon number of 1 to 6, a halogen-containing alkyl group having a carbon number of 1 to 6, an aryl group having a carbon number of 6 to 18, or a halogen-containing aryl group having a carbon number of 6 to 18. R10 is preferably an alkyl group having a carbon number of 1 to 6, more preferably a methyl group.

Further m represents an integer of 0 to 24, and when m is 2 or more, R10s may combine with each other to form a new ring structure. m is preferably an integer of 0 to 6, and m is more preferably 0.

Specific examples of 5,6-dimethylindenyl skeleton when Q and A form a 4-membered ring
(1) Dichlorosilacyclobutylenebis[2-(2-furyl)-4-phenyl-5,6-dimethyl-1-indenyl] zirconium
(2) Dichlorosilacyclobutylenebis[2-(5-methyl-2-furyl)-4-phenyl-5,6-dimethyl-1-indenyl]-zirconium
(3) Dichlorosilacyclobutylenebis[2-(4,5-dimethyl-2-furyl)-4-phenyl-5,6-dimethyl-1-indenyl] zirconium
(4) Dichlorosilacyclobutylenebis[2-(5-tert-butyl-2-furyl)-4-phenyl-5,6-dimethyl-1-indenyl] zirconium
(5) Dichlorosilacyclobutylenebis[2-(5-phenyl-2-furyl)-4-phenyl-5,6-dimethyl-1-indenyl] zirconium
(6) Dichlorosilacyclobutylenebis[2-(2-thienyl)-4-phenyl-5,6-dimethyl-1-indenyl] zirconium
(7) Dichlorosilacyclobutylenebis[2-(5-methyl-2-thienyl)-4-phenyl-5,6-dimethyl-1-indenyl] zirconium
(8) Dichlorosilacyclobutylenebis[2-(5-methyl-2-furyl)-4-(4-fluorophenyl)-5,6-dimethyl-1-indenyl] zirconium
(9) Dichlorosilacyclobutylenebis[2-(5-methyl-2-furyl)-4-(4-chlorophenyl)-5,6-dimethyl-1-indenyl] zirconium
(10) Dichlorosilacyclobutylenebis[2-(5-methyl-2-furyl)-4-(4-methylphenyl)-5,6-dimethyl-1-indenyl] zirconium
(11) Dichlorosilacyclobutylenebis[2-(5-methyl-2-fury))-4-(4-tert-butylphenyl)-5,6-dimethyl-1-indenyl] zirconium
(12) Dichlorosilacyclobutylenebis[2-(5-methyl-2-furyl)-4-(3,5-dimethylphenyl)-5,6-dimethyl-1-indenyl] zirconium
(13) Dichlorosilacyclobutylenebis[2-(5-methyl-2-furyl)-4-(3,5-di-tert-butylphenyl)-5,6-dimethyl-1-indenyl] zirconium
(14) Dichlorosilacyclobutylenebis[2-(5-methyl-2-furyl)-4-(1-naphthyl)-5,6-dimethyl-1-indenyl] zirconium
(15) Dichlorosilacyclobutylenebis[2-(5-methyl-2-furyl)-4-(2-naphthyl)-5,6-dimethyl-1-indenyl] zirconium
(16) Dichlorosilacyclobutylenebis[2-(5-methyl-2-furyl)-4-(4-biphenylyl)-5,6-dimethyl-1-indenyl] zirconium The most preferred metallocene catalyst is dichlorosilacyclobutylenebis[2-(5-methyl-2-furyl)-4-(4-tert-butylphenyl)-5,6-dimethyl-1-indenyl] zirconium.

The component (B), i.e., a compound reacting with the component (A) to form an ion pair, or an ion-exchange layered silicate, includes an aluminium oxy compound, a boron compound, an ion-exchange layered silicate, etc. and is preferably an ion-exchange layered silicate. As the component (B), one of these compounds may be used alone, or two or more thereof may be mixed and used.

The ion-exchange layered silicate (hereinafter, sometimes simply referred to as "silicate") indicates a silicate compound having a crystal structure in which planes each constituted by an ionic bond, etc. are stacked one another in parallel by a bonding force, and contained ions are exchangeable.

In the present invention, the silicate preferably used as the component (B) is one belonging to a smectite group and specifically includes montmorillonite, sauconite, beidellite, nontronite, saponite, hectorite, stevensite, etc. Among these, in view of activity and molecular weight of the rubber component, montmorillonite is preferred.

Most natural silicates are produced as a main component of clay mineral, and impurities (e.g., quartz, cristobalite) other than the ion-exchange layered silicate are contained in many cases. Impurities may be contained in the smectite group silicate for use in the present invention.

Further details of component B are disclosed in EP3121187 A1, filed by Japan Polypropylene Corporation Tokyo.

The polymerization of the polypropylene in step (a) can be accomplished in one reactor or in a reactor cascade of two or more reactors, preferably two reactors. It is especially preferred that the polymerization of the polypropylene takes place in at least two reactors, more preferably in two reactors, connected in series.

The polymerization process of step (a) suitable for producing the polypropylene according to this invention is known in the state of the art. It comprises at least one polymerization stage, where polymerization is typically carried out in solution, slurry, bulk or gas phase, preferably bulk. Typically, the polymerization process comprises additional polymerization stages or reactors. In one particular embodiment, the process contains one bulk reactor and optionally at least one gas phase reactor, and all reactors being arranged in cascade. In one particularly preferred embodiment, the polymerization process of step (a) comprises one bulk reactor and optionally one gas phase reactor arranged in that order. In this kind of processes, the use of higher polymerization temperatures is preferred. Typical temperatures in these processes are 65° C. or higher, preferably 70° C. or higher. The higher polymerization temperatures as mentioned above can be applied in some or all reactors of the reactor cascade.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315. A further suitable slurry-gas phase process is the Spheripol® process of Basell.

In this process step (a) propylene and optionally at least one α-olefin selected from ethylene, 1-butene and 1-hexene are polymerized. The most preferred comonomer is ethylene. Even more preferably in the polymerization step (a) only propylene is polymerized. That is, in case in step (a) a heterophasic polypropylene is produced it is preferred that in the first reactor, i.e. the bulk reactor, like the loop reactor, the matrix is produced and in the subsequent reactor(s) the rubber phase. However as mentioned above, it is preferred that the polypropylene according to this invention is monophasic. Accordingly, in case a random propylene copolymer is produced in the first and second reactor polymer fractions can be produced which differ in the comonomer content, like the ethylene content. In case of a propylene homopolymer in the first reactor, i.e. in the bulk reactor, like in the loop reactor, and in the subsequent gas phase reactor propylene homopolymer fractions can be produced which may differ in the molecular weight. Of course the random propylene copolymer as well as the propylene homopolymer can be also produced in just one reactor, like the bulk reactor, i.e. loop reactor. The number of reactors is not essential for the present invention. Essential is that the polypropylene of the present invention is produced in the presence of a metallocene catalyst, especially in presence of a metallocene catalyst of formula (I) or even more preferred of formula (II), as defined in detail above.

The polypropylene of step (a) is in the form of a powder. The polypropylene powder of step (a) can be either directly visbroken (step (c)) or can be first mixed with additives. Mixing first the polypropylene powder with additives allows an intermediate storage, i.e. the polymer powder must not be directly subjected to the visbreaking step (c). In case the polypropylene powder is mixed with additives, the mixing is preferably accomplished by extruding the polypropylene powder with additives. During extrusion the polypropylene is molten and intimately mixed with the additives. After extrusion the polymer mixture is pelletized. Consequently, the mixture of step (b) is preferably in the form of pellets. Whether the polypropylene powder of step (a) or the mixture of step (b), e.g. the polypropylene pellets of step (b), is/are used is not essential for the final product, i.e. the final polypropylene pellets of step (e). However, it is preferred that the process of the present invention is a continuous process. Accordingly it is preferred that the polypropylene powder of step (a) is directly transferred, i.e. without storage, to the visbreaking step (c). Accordingly it is especially preferred that step (b) is omitted and step (c) follows immediately after step (a).

The polypropylene, i.e. the polypropylene powder, after step (a) has a melt flow rate MFR$_2$ (230° C., 2.16 kg) measured according to ISO 1133 in the range of 1.0 to 100 g/10 min.

It is further preferred that the polypropylene powder after step (a) has a rather narrow molecular weight distribution (MWD). Accordingly it is preferred that the polypropylene powder after step (a) has a molecular weight distribution (MWD) determined by gel permeation chromatography (GPC) in the range of 2.0 to below 4.0, more preferably in the range of 2.5 to below 4.0.

It is especially preferred that the polypropylene powder after step (a) has a melt flow rate MFR$_2$ (230° C., 2.16 kg) measured according to ISO 1133 in the range of 1.0 to 100 g/10 min and a molecular weight distribution (MWD) determined by gel permeation chromatography (GPC) in the range of 2.0 to below 4.0, more preferably in the range of 2.5 to below 4.0.

As the polypropylene powder has been produced with a metallocene catalyst it has also a certain amount of mis-insertions. Accordingly it is preferred that the polypropylene powder after step (a) has 2,1 regio-defects determined by $^{13}$C-NMR spectroscopy in the range of 0.10 to 0.90%, more preferably in the range of 0.15 to 0.80%.

The Visbreaking Step (Step (c))

Essential aspect of the present invention is that the polypropylene of step (a) or step (b) is visbroken with a visbreaking agent during extrusion. In an extrusion process the polypropylene is molten and intimately contacted with the visbreaking agent. During visbreaking, higher molar mass chains of the starting product are broken statistically more frequently than lower molar mass molecules, resulting in an overall decrease of the average molecular weight, decrease of the molecular weight distribution (MWD) and an increase in melt flow rate MFR$_2$ (230° C.; 2.16 kg).

For visbreaking a continuous melt-mixing device is used. Typically as continuous melt-mixing device twin-screw extruders and single-screw extruders with special mixing sections and co-kneaders are used. Regardless which type of continuous melt-mixing device is used, the polypropylene powder of step (a) or the polypropylene of the mixture of step (b) is molten in the continuous melt-mixing device and subsequently pelletized.

The visbreaking may be carried out in any known manner using a visbreaking agent. Typically chemical visbreaking is achieved by using a peroxide or a hydroxylamine ester.

Typical peroxide visbreaking agents are 2,5-dimethyl-2, 5-bis(tert-butyl-peroxy)hexane (DHBP) (for instance sold under the tradenames Luperox 101 and Trigonox 101), 2,5-dimethyl-2,5-bis(tert-butyl-peroxy)hexyne-3 (DYBP) (for instance sold under the tradenames Luperox 130 and Trigonox 145), dicumyl-per oxide (DCUP) (for instance sold under the tradenames Luperox DC and Perkadox BC), di-tert-butyl-peroxide (DTBP) (for instance sold under the tradenames Trigonox B and Luperox Di), tertbutyl-cumyl-peroxide (BCUP) (for instance sold under the tradenames Trigonox T and Luperox 801) and bis(tert-butylperoxy-isopropyl)benzene (DIPP) (for instance sold under the tradenames Perkadox 14S and Lupperox DC).

Suitable amounts of peroxide to be employed in accordance with the present invention are in principle known to the skilled person and can easily be calculated on the basis of the amount of the polypropylene to be subjected to visbreaking, the MFR$_2$ (230° C.; 2.16 kg) value of the polypropylene to be subjected to visbreaking, and the desired target MFR$_2$ ((230° C.; 2.16 kg) of the final polypropylene. Accordingly, typical amounts of peroxide visbreaking agent are from 0.001 to 0.15 wt.-%, more preferably from 0.002 to 0.10 wt.-%, based on the amount of polypropylene employed.

Suitable visbreaking agents selected from the group of hydroxylamine esters are known in the state of the art, for example as described in WO 2007/126994 or WO 01/90113.

Preferred hydroxylamine esters are compounds of the formula (II)

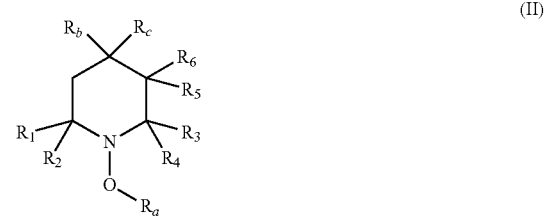

(II)

wherein R$_a$ represents acyl;
one of R$_b$ and R$_c$ represents hydrogen and the other one represents a substituent; or
R$_b$ and R$_c$ both represent hydrogen or identical or different substituents; or
R$_b$ and R$_c$ together represent oxygen;
R$_1$-R$_4$ each represent C$_1$-C$_6$ alkyl; and
R$_5$ and R$_6$ each represent independently of one another hydrogen, C$_1$-C$_6$ alkyl or C$_6$-C$_{10}$ aryl; or R$_5$ and R$_6$ together represent oxygen.

In the hydroxylamine ester (II) the term acyl with regard to the definition of R$_a$ preferably represents an acyl radical selected from the group consisting of —C(═O)—H, —C(═O)—C$_1$-C$_{19}$ alkyl, —C(═O)—C$_2$-C$_{19}$ alkenyl, —C(═O)—C$_2$-C$_4$ alkenyl-C$_4$-C$_{10}$ aryl, —C(═O)—C$_6$-C$_{10}$ aryl, —C(═O)—O—C$_1$-C$_6$ alkyl, —C(═O)—O—C$_6$-C$_{10}$ aryl, —C(═O)—NH—C$_1$-C$_6$ alkyl, —C(═O)—NHC$_6$-C$_{10}$ aryl and —C(═O)—N(C$_1$-C$_6$alkyl)$_2$;

$C_1$-$C_{19}$ alkyl in the acyl group $R_a$ is, for example, $C_1$-$C_6$ alkyl, e.g. methyl, ethyl, n-propyl or isopropyl or n-, sec- or tert-butyl or straight-chain or branched pentyl or hexyl, or $C_7$-$C_{19}$ alkyl, e.g. straight-chain or branched heptyl, octyl, isooctyl, nonyl, tert-nonyl, decyl or undecyl, or straight-chain $C_{11}$-$C_{19}$ alkyl, which together with the —(C=O)— radical forms $C_{14}$-$C_{20}$ alkanoyl having an even number of C-atoms, e.g. lauroyl ($C_{12}$), myristoyl ($C_{14}$), palmitoyl ($C_{16}$) or stearoyl ($C_{18}$).

$C_6$-$C_{10}$ aryl is, for example, carbocyclic monoaryl or diaryl, preferably monoaryl, e.g. phenyl, which may be monosubstituted or disubstituted by suitable substituents, e.g. $C_1$-$C_4$ alkyl, e.g. methyl, ethyl or tert-butyl, $C_1$-$C_4$ alkoxy, e.g. methoxy or ethoxy, or halogen, e.g. chlorine. In the case of disubstitution, the 2- and 6-positions are preferred.

The above-mentioned acyl radical $R_a$ may be substituted on the free valences by suitable substituents, e.g. fluorine or chlorine, and is preferably formyl, acetyl, trifluoroacetyl, pivaloyl, acryloyl, methacryloyl, oleoyl, cinnamoyl, benzoyl, 2,6-xyloyl, tert-butoxycarbonyl, ethylcarbmoyl or phenylcarbamoyl.

$C_1$-$C_6$ alkyl as $R_1$-$R_4$ is preferably $C_1$-$C_4$ alkyl, in particular $C_1$-$C_2$ alkyl, e.g. methyl or ethyl.

In preferred embodiments, $R_1$-$R_4$ are methyl or ethyl. Alternatively, from one to three substituents $R_1$-$R_4$ are ethyl. The remaining substituents are then methyl.

$R_5$ and $R_6$ are preferably hydrogen. $C_1$-$C_6$ alkyl or $C_6$-$C_{10}$ aryl as $R_5$ and $R_6$ are preferably methyl or phenyl.

The hydroxylamine esters (II) are known or can be prepared by known methods, e.g. by acylation of the corresponding >N—OH compound in a customary esterification reaction with an acid $R_a$—OH that introduces the group $R_a$ and corresponds to an acyl group selected, for example, from the group consisting of —C(=O)—H, —C(=O)—$C_1$-$C_{19}$ alkyl, —C(=O)—$C_2$-$C_{19}$ alkenyl, —C(=O)—$C_2$-$C_4$ alkenyl-$C_6$-$C_{10}$ aryl, —C(=O)—$C_6$-$C_{10}$ aryl, —C(=O)—O—$C_1$-$C_6$ alkyl, —C(=O)—O—$C_6$-$C_{10}$ aryl, —C(=O)—NH—$C_1$-$C_6$ alkyl, —C(=O)—NH—$C_6$-$C_{10}$ aryl and —C(=O)—N($C_1$-$C_6$alkyl)$_2$, or a reactive functional derivative thereof, e.g. the acid halide $R_a$—X, e.g. the acid chloride, or anhydride, e.g. ($R_a$)$_2$O. The hydroxylamine esters (II) and methods for their preparation are described in WO 01/30113.

A preferred hydroxylamine ester (II) is selected from the group consisting of sterically hindered amine derivatives of the formula:

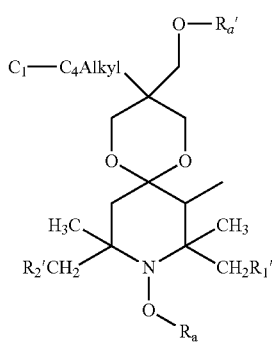

Wherein $R_1'$ and $R_2'$ independently of one another represent hydrogen or methyl;
$R_a$ represents $C_1$-$C_8$ alkanoyl; and
$R_a'$ represents $C_8$-$C_{22}$ alkanoyl.

According to a more preferred embodiment, the hydroxylamine ester (II) is selected from the group consisting of sterically hindered amine derivatives of the formula:

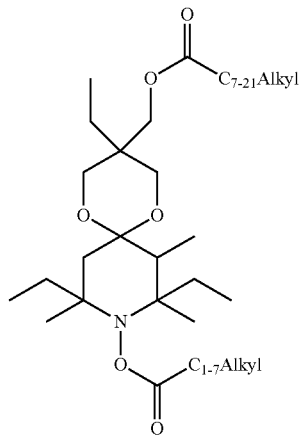

Most preferred is a compound of the above formula, in which the alkyl group is a $C_{17}$-group. Such a compound is commercially available under the tradename Irgatec® CR76, which is also mentioned in WO 2007/126994.

Suitable amounts of hydroxylamine ester to be employed in accordance with the present invention are in principle known to the skilled person and can easily be calculated on the basis of the amount of polypropylene to be subjected to visbreaking.

The hydroxylamine ester is preferably added in the form of a masterbatch containing these compounds in a polymer matrix in a concentration of, for example, from about 0.01 to 15 wt.-%, preferably from 0.05 to 8.0 wt.-%.

It is also possible to add during the visbreaking step additives in case of need.

According to the present invention, a certain visbreaking ratio must be applied. Thus, the visbreaking ratio (VR) must be in the range of 2.0 to 25.0, more preferably in the range of 2.5 to 20.0, even more preferably in the range of 3.0 to 15.0, wherein the visbreaking ratio (VR) is determined according to equation $$VR = MFR_{2(FINAL)} / MFR_{2(START)}$$

wherein
"$MFR_{2(FINAL)}$" is melt flow rate $MFR_2$ (230° C.; 2.16 kg) measured according to ISO 1133 of the polypropylene pellets after visbreaking,
"$MFR_{2(START)}$" is melt flow rate $MFR_2$ (230° C.; 2.16 kg) measured according to ISO 1133 of the polypropylene powder before visbreaking.

Additionally it is preferred that due to visbreaking not only the melt flow rate $MFR_2$ is significantly increased but also the molecular weight distribution decreased. Accordingly it is preferred that due to visbreaking the ratio $MWD_{(Start)}/MWD_{(Final)}$ is in the range of 1.01 to 2.50 is achieved,
wherein
$MWD_{(start)}$ is the molecular weight distribution (MWD) determined by gel permeation chromatography (GPC) of the polypropylene powder before visbreaking;
$MWD_{(Final)}$ is the molecular weight distribution (MWD) determined by gel permeation chromatography (GPC) of the polypropylene pellets after visbreaking.

The Aerating Step (Step (d)) and the Discharging (Step (e))

After the visbreaking step (c) the obtained polypropylene pellets must be degassed at elevated temperatures in an aeration vessel. According to the present invention the degassing is accomplished with an aeration gas having a temperature of at least 40° C. but lower than the heat deflection temperature (HDT) measured according to ISO 75 B method at a stress of 0.45 MPa of the polypropylene pellets, more preferably the aeration gas has a temperature of at least 60° C. but at least 3° C. lower than the heat deflection temperature (HDT) measured according to ISO 75 B method at a stress of 0.45 MPa of the polypropylene pellets. The aerating step (d) in the aeration vessel takes 1 to 15 hours, more preferably 2 to hours. Accordingly, it is especially preferred that the polypropylene pellets in the aeration vessel are aerated with the aeration gas for 2 to 10 hours, wherein the aeration gas has a temperature of at least 60° C. but at least 3° C. lower than the heat deflection temperature (HDT) measured according to ISO 75 B method at a stress of 0.45 MPa of the polypropylene pellets.

The polypropylene pellets of step (c) are filled in the aeration vessel forming a bed through which the aeration gas is passed.

The polypropylene pellets are preferably filled into the aeration vessel on the top and move vertically to the bottom of the aeration vessel where the degassed pellets are discharged.

The flow rate of the polypropylene pellets through the aeration vessel depend very much on the size of the aeration vessel and the required contact time with the aeration gas. Typically the flow rate is between 50 to 150 kg/h. According to a simplified design, the pellets may also remain immobile during the aeration process being conducted in a batch mode, i.e. filling the vessel before aeration and emptying the same after aeration.

The aeration gas input is preferably at the bottom of the aeration vessel, resulting in a aeration gas flow from the bottom to the top of the vessel passing thereby through the bed of the polypropylene pellets. In the present invention, the aeration gas inlet may preferably be selected from the group of: a nozzle, a series of nozzles, a gas distribution ring and a gas distribution plate.

Preferably, the total normalized volumetric airflow used for the aeration gas is from 1 to 5 Nm³/kg, preferably from 1.5 to 5 Nm³/kg, more preferably from 2 to 5 Nm³/kg, such as around 2.6 Nm³/kg.

Accordingly, it is preferred to have a current-counter flow of the polypropylene pellets and the aeration gas. Alternately, according to the simplified design, only the gas is flowing.

The aeration gas is preferably nitrogen or air, the latter is especially preferred.

The polypropylene pellets are preferably not mixed or moved throughout the aerating step in the aeration vessel by mechanical means. Consequently, during the aeration step (d) the polypropylene pellets are effectively stationary (apart from their vertical transit through the aeration vessel in the non-batch method). Therefore, the present invention preferably excludes processes where the polypropylene pellets are agitated during aeration; these processes preferably do not fall under the scope of this invention, such as fluidized bed processes.

Optionally the polypropylene pellets are pre-heated before being added to the aeration vessel, such as being pre-heated to at least 40° C., more preferably pre-heated to temperatures of from 60° C. to 80° C. before being added to the aeration vessel.

As the specific heat capacity of the polypropylene pellets together with the mass of the polypropylene pellets is significant compared to the specific heat capacity of the aeration gas together with the mass of the aeration gas, one has to be attentive that the gas stream temperatures are met for the inlet and the outlet of the aeration. Thus, if the polypropylene pellets are provided at relatively low temperatures in an aeration vessel, a pre-heating step will be necessary. The pre-heating can also naturally be effected by the gas-stream and the temperatures as specified above. However, during such pre-heating the temperature at the outlet will be lower as the heat is transferred to the polypropylene pellets.

Pre-heating could also be considered as not letting the polypropylene pellets cool down, which are produced, extruded and pelletized shortly beforehand, i.e. in the visbreaking step (c). Such pellets normally have a temperature of about 40° C. or higher, preferably 50° C. or higher. Hence, the specific advantage of the present process of the polypropylene pellets is that it can be carried out as an integrated process. That is, the aeration step (d) is carried out immediately after the visbreaking step (c), i.e. the polypropylene pellets of step (c) are not stored but are directly aerated.

The aeration vessel used in the process of the present invention is not particularly limited and in principle, any commercially available aeration vessel which encompasses also an aeration silo.

For shortening the pre-heating phase, avoiding energy loss during aeration and/or also increased homogeneity over the cross-section, the use of an isolated aeration vessel, preferentially an isolated aeration silo is preferred. Furthermore, the aeration vessel may be cylindrically shaped, or conically shaped, or cylindrical with cone shaped bottom portion.

After aeration the polypropylene pellets are discharged from the aeration vessel. Preferably the discharging applies at the bottom of the aeration vessel.

Considering the above information the following embodiments are especially preferred.

[1] Process for producing polypropylene pellets comprising the steps in the order of
(a) polymerizing propylene and optionally at least one α-olefin selected from ethylene, 1-butene and 1-hexene in the presence of a metallocene catalyst obtaining thereby a polypropylene in the form of a powder, wherein
the obtained polypropylene powder has a melt flow rate $MFR_2$ (230° C., 2.16 kg) measured according to ISO 1133 in the range of 1.0 to 100 g/10 min,
(b) optionally mixing the polypropylene powder with additives,
(c) visbreaking the polypropylene powder of step (a) or the mixture of step (b) with a visbreaking agent in a continuous melt-mixing device obtaining thereby a polypropylene in form of pellets,
wherein the polypropylene pellets have a melt flow rate $MFR_2$ (230° C., 2.16 kg) measured according to ISO 1133 being higher than the melt flow rate $MFR_2$ (230° C., 2.16 kg) of the polypropylene powder of step (a),
wherein further
the visbreaking ratio (VR) is in the range of 2.0 to 25.0, wherein the visbreaking ratio (VR) is determined according to equation $$VR = MFR_{2(FINAL)} / MFR_{2(START)}$$

wherein
"$MFR_{2(FINAL)}$" is melt flow rate $MFR_2$ (230° C.; 2.16 kg) measured according to ISO 1133 of the polypropylene pellets after visbreaking,
"$MFR_{2(START)}$" is melt flow rate $MFR_2$ (230° C.; 2.16 kg) measured according to ISO 1133 of the polypropylene powder before visbreaking,
(d) aerating the polypropylene pellets of step (c) in an aeration vessel for 1 to 15 hours with an aeration gas having a temperature of at least 40° C. but lower than the heat deflection temperature (HDT) measured according to ISO 75 B method at a stress of 0.45 MPa of the polypropylene pellets of step (c),
(e) discharging the polypropylene pellets of step (d) from the aeration vessel.

[2] Process according to paragraph [1] wherein the visbreaking agent is a peroxide or a hydroxylamine ester, preferably a peroxide.

[3] Process according to paragraph [1] or [2], wherein the metallocene catalyst has the formula (I)

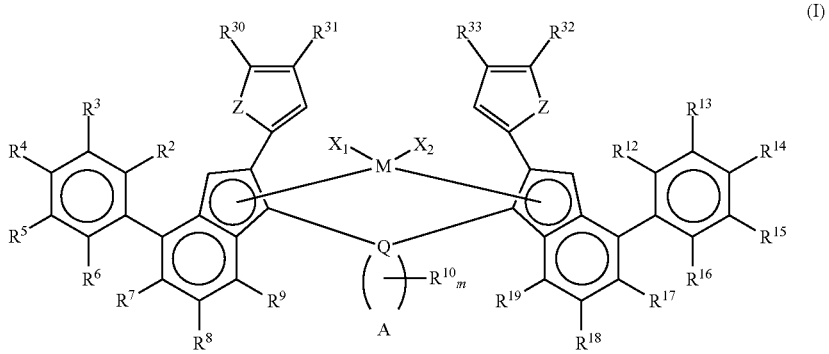

(I)

wherein
M is Ti, Zr or Hf.
Z is an oxygen atom or a sulfur atom,
$R^{30}$, $R^{31}$, $R^{32}$ and $R^{33}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, or an aryl group having a carbon number of 6 to 18,
Q is a carbon atom, a silicon atom or a germanium atom,
each of $X_1$ and $X_2$ is independently a halogen atom, an alkyl group having a carbon number of 1 to 6, an aryl group having a carbon number of 6 to 18, an amino group substituted with an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18,
$R^7$ and $R^{17}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, or a halogen-containing aryl group having a carbon number of 6 to 18, and when either one of $R^7$ and $R^{17}$ is a hydrogen atom, the other is a substituent except for a hydrogen atom,
$R^8$ and $R^{18}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18,
$R^2$, $R^3$, $R^4$, $R^5$, $R^6$, $R^9$, $R^{12}$, $R^{13}$, $R^{14}$, $R^{15}$, $R^{16}$ and $R^{19}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, a halogen-containing aryl group having a carbon number of 6 to 18,
A is a divalent hydrocarbon group having a carbon number of 3 to 12 and forming a ring together with Q to which it is bonded, and may contain an unsaturated bond,
$R^{10}$ is a substituent on A and is an alkyl group having a carbon number of 1 to 6, a halogen containing alkyl group having a carbon number of 1 to 6, a trialkylsilyl group-containing alkyl group having a carbon number of 1 to 6, a silyl group containing a hydrocarbon group having a carbon number of 1 to 6, an aryl group having a carbon number of 6 to 18, or a halogen-containing aryl group having a carbon number of 6 to 18,
m represents an integer of 0 to 24, and when m is 2 or more, $R^{10}$s may combine with each other to form a new ring structure).

[4] Process according to paragraph [3], wherein the metallocene catalyst is dichlorosilacyclobutylenebis[2-(5-methyl-2-furyl)-4-(4-tert-butylphenyl)-5,6-dimethyl-1-indenyl] zirconium.

[5] Process according to any one of the preceding paragraphs [1] to [4] wherein the polymerization of step (a) takes place in two reactors connected in series, wherein preferably the first reactor is bulk reactor and the second reactor is a gas phase reactor.

[6] Process according to any one of the preceding paragraphs [1] to [5] wherein in step (c) additionally additives are added into the continuous melt-mixing device.

[7] Process according to any one of the preceding paragraphs [1] to [6] wherein step (b) is omitted.

[8] Process according to any one of the preceding paragraphs [1] to [7] wherein polypropylene pellets of step (c) are directly transferred to the aeration vessel to perform step (d).

[9] Process according to any one of the preceding paragraphs [1] to [8] wherein the process is a continuous process.

[10] Process according to any one of the preceding paragraphs [1] to [9] wherein polypropylene pellets in step (d) are not agitated.

[11] Process according to paragraph [10] wherein the aeration vessel contains no mixing means.

[12] Process according to any one of the preceding paragraphs [1] to [11] wherein polypropylene pellets after step (e) consists of
(a) 95.0 to 99.95 wt.-% of a polypropylene, and
(b) 0.05 to 5.0 wt.-% of additives
based on the total amount of the polypropylene pellets.

[13] Process according to any one of the preceding paragraphs [1] to [12] wherein polypropylene pellets have a median particle size d50 in the range of 2.5 to 5.0 mm.

[14] Process according to any one of the preceding paragraphs [1] to [13] wherein the polypropylene of the polypropylene pellets has 2,1 regio-defects determined by 13O-NMR spectroscopy in the range of 0.10 to 0.90%.

[15] Process according to paragraph [14] wherein the polypropylene of the polypropylene pellets has 2,1 regio-defects determined by $^{13}$C-NMR spectroscopy in the range of 0.15 to 0.80%.

[16] Process according to any one of the preceding paragraphs [1] to [15] wherein the polypropylene pellets have a melt flow rate $MFR_2$ (230° C., 2.16 kg) measured according to ISO 1133 in the range of 20 to 2000 g/10 min.

[17] Process according to paragraph [16] wherein the polypropylene pellets have a melt flow rate $MFR_2$ (230° C., 2.16 kg) measured according to ISO 1133 in the range of 40 to 1500 g/10 min.

[18] Process according to any one of the preceding paragraphs [1] to [17] wherein the polypropylene pellets have a molecular weight distribution (MWD) determined by gel permeation chromatography (GPC) in the range of 1.0 to below 3.2.

[19] Process according to paragraph [18] wherein the polypropylene pellets have a molecular weight distribution (MWD) determined by gel permeation chromatography (GPC) in the range of 1.5 to below 3.0.

[20] Process according to any one of the preceding paragraphs [1] to [19] wherein the polypropylene of the polypropylene pellets have a comonomer content of not more than 5.0 wt.-%.

[20] Process according to any one of the preceding paragraphs [1] to [19] wherein the polypropylene of the polypropylene pellets is a monophasic polypropylene.

[21] Process according to paragraph [20] wherein the monophasic polypropylene is a propylene homopolymer.

[22] Process according to any one of the preceding paragraphs [1] to [21] wherein the polypropylene powder of step (a) has a molecular weight distribution (MWD) determined by gel permeation chromatography (GPC) in the range of 2.0 to below 4.0.

[23] Process according to any one of the preceding paragraphs [1] to [22] wherein the ratio $MWD_{(Start)}/MWD_{(Final)}$ is in the range of 1.01 to 2.50,
wherein
$MWD_{(start)}$ is the molecular weight distribution (MWD) determined by gel permeation chromatography (GPC) of the polypropylene powder before visbreaking;
$MWD_{(Final)}$ is the molecular weight distribution (MWD) determined by gel permeation chromatography (GPC) of the polypropylene pellets after visbreaking.

[24] Process according to any one of the preceding paragraphs [1] to [23] wherein the polypropylene pellets after step (e) have a VOC (volatile organic compounds) value determined according to VDA 278 October 2011 in the range of 3.0 to 50 µg/g.

[25] Process according to paragraph [24] wherein the polypropylene pellets after step (e) have a VOC (volatile organic compounds) value determined according to VDA 278 October 2011 in the range of 5.0 to 45 µg/g.

[26] Process according to any one of the preceding paragraphs [1] to [25] wherein the polypropylene pellets after step (e) have a FOG (low volatility or condensable organic compounds) value determined according to VDA 278 October 2011 in the range of 10 to 80 µg/g.

[27] Process according to any one of the preceding paragraphs [1] to [26] wherein the polypropylene pellets after step (e) have a xylene cold soluble (XCS) fraction measured according to ISO 16152 (25° C.) in the range of 0.05 to 2.50 wt.-%.

[28] Process according to paragraph [27] wherein the polypropylene pellets after step (e) have a xylene cold soluble (XCS) fraction measured according to ISO 16152 (25° C.) in the range of 0.05 to 1.50 wt.-%.

[29] Process according to any one of the preceding paragraphs [1] to [28] wherein the visbreaking ratio (VR) is in the range of 2.5 to 20.0.

[30] Process according to any one of the preceding paragraphs [1] to [29] wherein the aeration gas in step (d) has a temperature of at least 60° C. but at least 3° C. lower than the heat deflection temperature (HDT) measured according to ISO 75 B method at a stress of 0.45 MPa of the polypropylene pellets of step (c).

[31] Process according to any one of the preceding paragraphs [1] to [30] wherein the aeration time in step (d) is in the range of 2 to 10 hours.

[32] Process according to any one of the preceding paragraphs [1] to [31] wherein wherein the aeration gas is air.

[33] Process according to any one of the preceding paragraphs [1] to [32] wherein the polypropylene pellets of step (c) are fed into the aeration vessel from the top of said vessel, transit vertical down the vessel and are discharged on the bottom of the vessel.

[34] Process according to any one of the preceding paragraphs [1] to [33] wherein the aeration gas is introduced at the bottom of the aeration vessel, passed through the bed of the polypropylene pellets, leaves the aeration vessel at the top.

[35] Process according to any one of the preceding paragraphs [1] to [34] performing a counter-current flow of the polypropylene pellets and the aeration gas in step (d).

[36] Process according to any one of the preceding paragraphs [1] to [35] wherein the aeration vessel is cylindrical, or conical, or cylindrical with cone shaped bottom portion.

In the following, the present invention is described by way of examples.

EXAMPLES

1. Determination Methods

The following definitions of terms and determination methods apply for the above general description of the invention as well as to the below examples unless otherwise defined.

a) Melt Flow Rate

The melt flow rate ($MFR_2$) is determined according to ISO 1133 and is indicated in g/10 min. The $MFR_2$ of polypropylene is determined at a temperature of 230° C. and under a load of 2.16 kg.

b) Xylene Cold Soluble Fraction (XCS, Wt %)

The amount of the polymer soluble in xylene is determined at 25.0° C. according to ISO 16152; 1th edition; 2005 Jul. 1.

c) Heat Deflection Temperature

Heat deflection temperature (HDT) is measured according to ISO 75 B method at a stress of 0.45 MPa using test bars of 80×10×4 mm³ injection moulded in line with EN ISO 1873-2.

d) Melting Temperature $T_m$

The melting temperature $T_m$ is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The melting temperature ($T_m$) and melting enthalpy ($H_m$) are being determined in the second heating step.

e) Quantification of Copolymer Microstructure by $^{13}C$-NMR Spectroscopy

Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for 1H and 130 respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{_1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E \text{ [mol \%]}=100*fE$$

The weight percent comonomer incorporation was calculated from the mole fraction:

$$E \text{ [wt \%]}=100*(fE*28.06)/((fE*28.06)+((1-fE)*42.08))$$

f) Number Average Molecular Weight (Mn), Weight Average Molecular Weight (Mw) and the Molecular Weight Distribution (Mw/Mn)

Number average molecular weight ($M_n$), weight average molecular weight ($M_w$) and the molecular weight distribution ($M_w/M_n$) were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

g) VOC and FOG

VOC values and FOG values were measured according to VDA 278 (October 2011; Thermal Desorption Analysis of Organic Emissions for the Characterization of Non-Metallic Materials for Automobiles, VDA Verband der Automobilindustrie) after sample preparation of injection moulding plaques according to EN ISO 19069-2:2016. These plaques were packed in aluminium-composite foils immediately after production and the foils were sealed. According to the VDA 278 October 2011 the VOC value is defined as "the total of the readily volatile to medium volatile substances. It is calculated as toluene equivalent. The method described in this recommendation allows substances in the boiling/elution range up to n-pentacosane (025) to be determined and analyzed."

The FOG value is defined as "the total of substances with low volatility, which elute from the retention time of n-tetradecane (inclusive)". It is calculated as hexadecane equivalent. Substances in the boiling range of n-alkanes "$C_{14}$" to "$C_{32}$" are determined and analysed.

h) Diameter of Polypropylene Pellets

A sieve analysis according to ISO 3310 was performed. The sieve analysis involved a nested column of sieves with wire mesh screen with the following sizes: >20 µm, >32 µm, >63 µm, >100 µm, >125 µm, >160 µm, >200 µm, >250 µm, >315 µm, >400 µm, >500 µm, >710 µm, >1 mm, >1.4 mm, >2 mm, >2.8 mm, >4 mm. The samples were poured into the top sieve, which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve. The particle size distribution and the characteristic median particle size d50 was determined from the results of the sieve analysis according to ISO 9276-2.

2. Preparation of the Polypropylene Pellets

Preparation of the Metallocene Catalyst System (a) Acid and Base Treatment of Ion-Exchangeable Layered Silicate Particles Benclay SL, whose major component is 2:1-layered montmorillonite (smectite), was purchased from Mizusawa Industrial Chemicals, Ltd, and used for catalyst preparation. Benclay SL has the following properties:

Median size D50=46.9 µm

Chemical composition [wt.-%]: Al 9.09, Si 32.8, Fe 2.63, Mg 2.12, Na 2.39, Al/Si 0.289 mol/mol Acid Treatment To a 2 L-flask equipped with a reflux condenser and a mechanical agitation unit, 1300 g of distilled water and 168 g of sulfuric acid (96%) were introduced. The mixture was heated to 95° C. by an oil bath, and 200 g of Benclay SL was added. Then the mixture was stirred at 95° C. for 840 min. The reaction was quenched by pouring the mixture into 2 L of pure water. The crude product was filtrated with a Buechner funnel connected with an aspirator and washed with 1 L of distilled water. Then the washed cake was re-dispersed in 902.1 g of distilled water. The pH of the dispersion was 1.7.

Base Treatment

The aqueous solution of LiOH was prepared by solving 3.54 g of lithium hydroxide monohydrate into 42.11 g of distilled water. Then the aqueous LiOH solution was introduced to a dropping funnel and dripped in the dispersion obtained above at 40° C. The mixture was stirred at 40° C. for 90 min. The pH of the dispersion was monitored through the reaction and stayed less than 8. The pH of the reaction mixture was 5.68. The crude product was filtrated with a Buechner funnel connected with an aspirator and washed 3 times with 2 L of distilled water each.

The chemically treated ion-exchangeable layered silicate particles were obtained by drying the above cake at 110° C. overnight. The yield was 140.8 g. Then the silicate particles were introduced into a 1 L-flask and heated to 200° C. under vacuum. After confirming that gas generation was stopped, the silicate particles were dried under vacuum at 200° C. for 2 h. The catalyst component for olefin polymerization of the present innovation was obtained.

Preparation of Catalyst (b) Reaction with Organic Aluminum

To a 1000 ml flask, 10 g of the chemically treated ion exchangeable layered silicate particles obtained above (the catalyst component for olefin polymerization of the present invention) and 36 ml of heptane were introduced. To the flask, 64 ml of heptane solution of tri-n-octyl-aluminium (TnOA), which includes 25 mmol of TnOA, was introduced. The mixture was stirred at ambient temperature for 1 h. The supernatant liquid was removed by decantation, and the solid material was washed twice with 900 ml of heptane. Then the total volume of reaction mixture was adjusted to 50 ml by adding heptane.

(c) Prepolymerization

To the heptane slurry of the ion-exchangeable layered silicate particles treated with TnOA as described above, 31 ml of heptane solution of TnOA (12.2 mmol of TnOA) was added.

To a 200 ml flask, 283 mg of (r)-dichlorosilacyclobutylene-bis [2-(5-methyl-2-furyl)-4-(4-t-butylphenyl)-5,6-dimethyl-1-indenyl] zirconium (300 µmol) and 30 ml of toluene were introduced. Then the obtained complex solution was introduced to the heptane slurry of the silicate particles. The mixture was stirred at 40° C. for 60 min.

Then the mixture was introduced into a 1 L-autoclave with a mechanical stirrer, whose internal atmosphere was fully replaced with nitrogen in advance of use. The autoclave was heated to 40° C. After confirming the internal temperature was stable at 40° C., propylene was introduced at the rate of 10 g/h at 40° C. Propylene feeding was stopped after 2 h and the mixture was stirred at 40° C. for 1 h.

Then the residual propylene gas was purged out and reaction mixture was discharged into a glass flask. The supernatant solvent was discharged after settling enough. Then 8.3 ml of heptane solution of TiBAL (6 mmol) was added to the solid part. The mixture was dried under vacuum. The yield of solid catalyst for olefin polymerization (prepolymerized catalyst) was 35.83 g. Prepolymerization degree (the weight of prepolymer divided by the weight of solid catalyst) was 2.42.

Step (a): Process of the Propylene Homopolymer Powder

TABLE 1

Polymerization conditions for producing the polypropylene powder, i.e. the propylene homopolymer powder HPP

|  |  | HPP |
|---|---|---|
| Prepolymerization |  |  |
| Temperature | [° C.] | 25 |
| Pressure | [kPa] | 5145 |
| Catalyst feed | [g/h] | 2.5 |

TABLE 1-continued

Polymerization conditions for producing the polypropylene powder, i.e. the propylene homopolymer powder HPP

|  |  | HPP |
|---|---|---|
| C3 feed | [kg/h] | 47 |
| H2/C3 ratio | [mol/kmol] | 0.07 |
| Residence time | [h] | 0.4 |
| Loop (Reactor 1) |  |  |
| Temperature | [° C.] | 70 |
| Pressure | [kPa] | 5382 |
| H2/C3 ratio | [mol/kmol] | 0.24 |
| Residence time | [h] | 0.39 |
| Loop reactor split | [wt.-%] | 60 |
| $MFR_2$ | [g/10 min] | 21 |
| GPR (Reactor 2) |  |  |
| Temperature | [° C.] | 80 |
| Pressure | [kPa] | 2500 |
| H2/C3 ratio | [mol/kmol] | 1.5 |
| Polymer residence time | [h] | 2.0 |
| GPR reactor split | [wt.-%] | 40 |
| Powder properties |  |  |
| Tm | [° C.] | 160 |
| MWD | [—] | 3.3 |
| XCS | [wt.-%] | 0.60 |
| $MFR_2$ | [g/10 min] | 25.0 |
| <2.1> defects | [%] | 0.25 |
| HDT ISO 75 B | [° C.] | 94 |

No step (b) had been applied. The propylene homopolymer powder was directly used in step (c).

Step (c): Visbreaking of the Propylene Homopolymer Powder HPP to the Propylene Homopolymer Pellets HPP1

In a second step the propylene homopolymer powder HPP was visbroken to propylene homopolymer pellets HPP1 by using a co-rotating twin-screw extruder at 200-230° C. and using (tert.-butylperoxy)-2,5-dimethylhexane (Trigonox 101, distributed by Akzo Nobel, Netherlands) in an appropriate amount to achieve the target $MFR_2$ as indicated in table 2. Additionally to the peroxide the following combination of additives was used in compounding: 0.0525 wt % of Tris(2,4-di-t-butylphenyl) phosphite (CAS-No. 31570-04-4, commercially available as Irgafos 168 from BASF AF, Germany), 0.0525 wt % of Pentaerythrityl-tetrakis(3-(3',5'-di-tert. butyl-4-hydroxyphenyl)-propionate (CAS-No. 6683-19-8, commercially available as Irganox 1010 from BASF AG, Germany) and 0.03 wt.-% of calcium stearate of FACI SpA, Italy. The amounts of additives are based on the weight of the propylene homopolymer pellets. The remaining part is the propylene homopolymer (see table 2 below).

The properties of the propylene homopolymer pellets HPP1 are summarized in table 2.

TABLE 2

Properties of propylene homopolymer pellets HPP1

|  |  | HPP1 |
|---|---|---|
| Properties |  |  |
| Tm | [° C.] | 160 |
| HDT ISO 75 B | [° C.] | 94 |
| MWD | [—] | 2.8 |
| XCS | [wt.-%] | 0.70 |
| $MFR_2$ | [g/10 min] | 119 |
| <2.1> defects | [%] | 0.25 |
| VB ratio | [—] | 4.8 |
| $MWD_{(Start)}/MWD_{(Final)}$ | [—] | 1.18 |

TABLE 2-continued

Properties of propylene homopolymer pellets HPP1

|  |  | HPP1 |
|---|---|---|
| Total amount of additives | [wt.-%] | 0.135 |
| d50 | [mm] | 3.5 |

Steps (d) and (e): Aeration and Discharging

Aeration was carried out in an insulated cylindrically shaped silo with dimensions of 1.5 m³. The pellets had a median particle size d50 of 3.5 mm (ISO 3310, evaluation according to ISO 9276-2).

The aeration process was carried at different time intervals as indicated in table 3. A gas flow rate of 260 m³/h was used. This corresponds to a normalised gas flow of 2.6 Nm³/kg. The gas was fed into the silo at the bottom, passed through the propylene homopolymer pellets HPP1 and was released at the top of the silo. The gas was hot air with temperatures as indicated in table 3. The propylene homopolymer pellets HPP1 were fed to the silo before starting the aeration and discharged after ending.

The amount of volatiles of the propylene homopolymer pellets HPP1 under different aeration conditions is summarized in Table 3.

TABLE 3

Volatiles of the propylene homopolymer pellets under different conditions

|  |  | IE1 | IE2 | CE1* | CE2 | CE3** |
|---|---|---|---|---|---|---|
| Conditions |  |  |  |  |  |  |
| Time | [h] | 6 | 3 | 0 | 6 | 0 |
| Gas temperature | [° C.] | 60 | 90 | 23 | 23 | 23 |
| Properties |  |  |  |  |  |  |
| MWD | [—] | 2.8 | 2.8 | 2.8 | 2.8 | 3.7 |
| $MFR_2$ | [g/10 min] | 119 | 119 | 119 | 119 | 125 |
| VOC | [µg/g] | 37 | 9 | 79 | 63 | 299 |
| FOG | [µg/g] | 70 | 40 | 86 | 84 | 607 |

*the propylene homopolymer pellets of comparative example CE1 have been not subjected aeration step (d); the volatiles were measured on the propylene homopolymer pellets after the visbreaking step (c).
**Comparative example CE3 is the commercial PP homopolymer HK060AE of Borealis AG, Austria being produced by visbreaking from a base polymer having an MFR of 87 and based on a conventional 4$^{th}$ generation Ziegler-Natta type catalyst. The VB ratio is 1.4, the final polymer has a melting point of 165° C., an HDT ISO 75 B off 101° C. and an XCS content of 2.8 wt.-%.

The invention claimed is:

1. A process for producing polypropylene pellets comprising the steps in the following order:
   (a) polymerizing propylene and optionally at least one α-olefin selected from ethylene, 1-butene and 1-hexene in the presence of a metallocene catalyst, obtaining thereby a polypropylene in the form of a powder,
   wherein the obtained polypropylene powder has a melt flow rate $MFR_2$ (230° C., 2.16 kg) measured according to ISO 1133 in the range of 1.0 to 100 g/10 min,
   (b) optionally mixing the polypropylene powder with additives,
   (c) visbreaking the polypropylene powder of step (a) or the mixture of step (b) with a visbreaking agent in a continuous melt-mixing device obtaining thereby a polypropylene in form of pellets,
   wherein the polypropylene pellets have a melt flow rate $MFR_2$ (230° C., 2.16 kg) measured according to ISO 1133 being higher than the melt flow rate $MFR_2$ (230° C., 2.16 kg) of the polypropylene powder of step (a), wherein further the visbreaking ratio (VR) is in the range of 2.0 to 25.0, wherein the visbreaking ratio (VR) is determined according to equation $$VR = MFR_{2(FINAL)}/MFR_{2(START)} \qquad 5$$

wherein $MFR_{2(FINAL)}$ is melt flow rate $MFR_2$ (230° C.; 2.16 kg) measured according to ISO 1133 of the polypropylene pellets after visbreaking, $MFR_{2(START)}$ is melt flow rate $MFR_2$ (230° C.; 2.16 kg) measured according to ISO 1133 of the polypropylene powder before visbreaking, (d) aerating the polypropylene pellets of step (c) in an aeration vessel for 1 to 15 hours with an aeration gas having a temperature of at least 40° C. but lower than the heat deflection temperature (HDT) measured according to ISO 75 B method at a stress of 0.45 MPa of the polypropylene pellets of step (c), and (e) discharging the polypropylene pellets of step (d) from the aeration vessel.

2. The process according to claim 1, wherein the visbreaking agent is a peroxide or a hydroxylamine ester.

3. The process according to claim 1, wherein the metallocene catalyst has the formula (I):

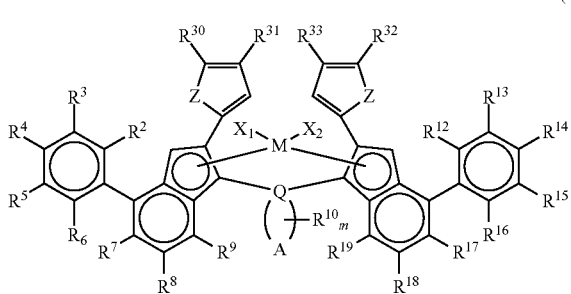

wherein

M is Ti, Zr or Hf,

Z is an oxygen atom or a sulfur atom, $R^{30}$, $R^{31}$, $R^{32}$ and $R^{33}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, or an aryl group having a carbon number of 6 to 18, Q is a carbon atom, a silicon atom or a germanium atom, each of $X_1$ and $X_2$ is independently a halogen atom, an alkyl group having a carbon number of 1 to 6, an aryl group having a carbon number of 6 to 18, an amino group substituted with an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18, $R^7$ and $R^{17}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, or a halogen-containing aryl group having a carbon number of 6 to 18, and when either one of $R^7$ and $R^{17}$ is a hydrogen atom, the other is a substituent except for a hydrogen atom, $R^8$ and $R^{18}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, or a halogen-containing aryl group having a carbon number of 6 to 18, $R^2$, $R^3$, $R^4$, $R^5$, $R^6$, $R^9$, $R^{12}$, $R^{13}$, $R^{14}$, $R^{15}$, $R^{16}$ and $R^{19}$ may be the same or different and are a hydrogen atom, a halogen atom, an alkyl group having a carbon number of 1 to 6, an alkoxy group having a carbon number of 1 to 6, a halogen-containing alkyl group having a carbon number of 1 to 6, an aryl group having a carbon number of 6 to 18, a halogen-containing aryl group having a carbon number of 6 to 18, A is a divalent hydrocarbon group having a carbon number of 3 to 12 and forming a ring together with Q to which it is bonded, and may contain an unsaturated bond, $R^{10}$ is a substituent on A and is an alkyl group having a carbon number of 1 to 6, a halogen containing alkyl group having a carbon number of 1 to 6, a trialkylsilyl group-containing alkyl group having a carbon number of 1 to 6, a silyl group containing a hydrocarbon group having a carbon number of 1 to 6, an aryl group having a carbon number of 6 to 18, or a halogen-containing aryl group having a carbon number of 6 to 18, m represents an integer of 0 to 24, and when m is 2 or more, $R^{10}$s may combine with each other to form a new ring structure.

4. The process according to claim 1, wherein the polymerization of step (a) takes place in two reactors connected in series.

5. The process according to claim 1, wherein in step (c) additionally additives are added into the continuous melt-mixing device.

6. The process according to claim 1, wherein step (b) is omitted.

7. The process according to claim 1, wherein polypropylene pellets after step (e) consist of:

(a) 95.0 to 99.95 wt. % of a polypropylene, and (b) 0.05 to 5.0 wt. % of additives, based on the total amount of the polypropylene pellets.

8. The process according to claim 1, wherein the polypropylene pellets after step (e) have a melt flow rate $MFR_2$ (230° C., 2.16 kg) measured according to ISO 1133 in the range of 40 to 1500 g/10 min.

9. The process according to claim 1, wherein:

(a) the polypropylene pellets have a molecular weight distribution (MWD) determined by gel permeation chromatography (GPC) in the range of 1.0 to below 3.2, and (b) the polypropylene of the polypropylene pellets has 2,1 regio-defects determined by $^{13}$C-NMR spectroscopy in the range of 0.10 to 0.90%.

10. The process according to claim 1, wherein the polypropylene of the polypropylene pellets has a comonomer content of not more than 5.0 wt. %.

11. The process according to claim 1, wherein the polypropylene of the polypropylene pellets is a monophasic polypropylene.

12. The process according to claim 11, wherein the monophasic polypropylene is a propylene homopolymer.

13. The process according to claim 1, wherein the polypropylene powder has a molecular weight distribution (MWD) determined by gel permeation chromatography (GPC) in the range of 2.0 to below 4.0, wherein further the ratio MWD (Start)/MWD (Final) is in the range of 1.01 to 2.50,
wherein
$MWD_{(Start)}$ is the molecular weight distribution (MWD) determined by gel permeation chromatography (GPC) of the polypropylene powder before visbreaking;
$MWD_{(Final)}$ is the molecular weight distribution (MWD) determined by gel permeation chromatography (GPC) of the polypropylene pellets after visbreaking.

14. The process according to claim 1, wherein the polypropylene pellets after step (e) have a VOC (volatile organic compounds) value determined according to VDA 278 October 2011 in the range of 3.0 to 50 µg/g and a FOG (low volatility or condensable organic compounds) value determined according to VDA 278 October 2011 in the range of 10 to 80 µg/g.

15. The process according to claim 1, wherein the aeration gas is air.

16. The process according to claim 4, wherein the first reactor is a bulk reactor and the second reactor is a gas phase reactor.

17. The process according to claim 7, wherein the polypropylene pellets have a median particle size d50 in the range of 2.5 to 5.0 mm.

* * * * *